US009482113B2

(12) United States Patent
Graily et al.

(10) Patent No.: US 9,482,113 B2
(45) Date of Patent: Nov. 1, 2016

(54) MOUNTING SYSTEM FOR A NACELLE FIRE DETECTION SYSTEM

(71) Applicant: Rohr, Inc., Chula Vista, CA (US)

(72) Inventors: Bahram Graily, La Jolla, CA (US); Aleksandar Ratajac, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 741 days.

(21) Appl. No.: 13/886,925

(22) Filed: May 3, 2013

(65) Prior Publication Data

US 2013/0294900 A1    Nov. 7, 2013

Related U.S. Application Data

(60) Provisional application No. 61/642,408, filed on May 3, 2012.

(51) Int. Cl.
| | | |
|---|---|---|
| *F01D 25/14* | (2006.01) | |
| *F02C 7/25* | (2006.01) | |
| *B64C 1/40* | (2006.01) | |
| *B64D 45/00* | (2006.01) | |

(52) U.S. Cl.
CPC ............ *F01D 25/145* (2013.01); *B64C 1/406* (2013.01); *F02C 7/25* (2013.01); *B64D 2045/009* (2013.01); *Y02T 50/672* (2013.01)

(58) Field of Classification Search
CPC ...... F01D 25/28; F01D 25/145; F01D 21/12; F01D 21/14; F02C 7/24; F02C 7/25; B64C 1/40; B64C 1/403; B64C 1/406
USPC ........................................... 60/39.091, 39.11
See application file for complete search history.

(56) References Cited

U.S. PATENT DOCUMENTS

| | | | |
|---|---|---|---|
| 4,848,514 A | 7/1989 | Snyder | |
| 5,251,435 A | 10/1993 | Pauley | |
| 5,827,998 A | 10/1998 | Moriguchi | |
| 5,976,997 A | 11/1999 | Meaney et al. | |
| 7,090,165 B2 | 8/2006 | Jones et al. | |
| 7,419,124 B2 * | 9/2008 | Zeuner | B64C 1/066 244/121 |
| 7,878,747 B2 | 2/2011 | Dean et al. | |
| 2007/0164160 A1 * | 7/2007 | Guillois | B64D 33/00 244/129.2 |

(Continued)

FOREIGN PATENT DOCUMENTS

WO        2007120349        10/2007

OTHER PUBLICATIONS

International search report for PCT/US13/39515 dated Oct. 10, 2013.

*Primary Examiner* — Christopher Verdier
*Assistant Examiner* — Brian P Wolcott
(74) *Attorney, Agent, or Firm* — O'Shea Getz P.C.

(57) ABSTRACT

A mounting system for a fire detection system for a turbofan engine propulsion system is provided to mount fire detection sensors on the inner fixed structure (IFS) of the nacelle. The mounting system mounts to an inner, engine facing surface of the IFS. Two IFS halves cooperate to form a substantially enclosed space around an engine core. The mounting system includes part of a fastening system mounted to the IFS, and an orientation clip mounted to a thermal blanket. Brackets for mounting the fire detection system sensing wires are positioned on the orientation clip, and the fastening system fixes the bracket to the IFS and traps the thermal blanket therebetween.

18 Claims, 17 Drawing Sheets

(56) References Cited

U.S. PATENT DOCUMENTS

| | | |
|---|---|---|
| 2008/0112796 A1 | 5/2008 | Coney et al. |
| 2010/0021268 A1 | 1/2010 | Dean et al. |
| 2010/0034614 A1 | 2/2010 | Dean et al. |
| 2010/0177801 A1 | 7/2010 | Geren et al. |
| 2011/0088245 A1 | 4/2011 | Dean et al. |
| 2012/0012218 A1 | 1/2012 | Sabadie et al. |
| 2012/0018580 A1 | 1/2012 | Holvoet et al. |

* cited by examiner

MOUNTING SYSTEM FOR A NACELLE FIRE DETECTION SYSTEM

This application claims priority to U.S. patent application Ser. No. 61/642,408 filed May 3, 2012.

BACKGROUND

A typical aircraft turbofan propulsion system includes a jet engine (also called an engine core, or simply a core), a nacelle that surrounds the engine core, and a fan driven by the engine that draws in a flow of air that is split into a bypass airflow and an engine core airflow. The nacelle defines a bypass duct that surrounds the engine core. The bypass airflow is transported through the bypass duct and exits the bypass duct at a high speed at an aft end thereof. The engine core includes a multi-stage compressor to compress the engine core airflow, a combustor to add thermal energy to the compressed engine core airflow, and a turbine section downstream of the combustor to produce mechanical power from the engine core airflow. The mechanical power from the turbine section drives the compressor and the fan. After exiting the turbine section, the engine core airflow exits through an exhaust nozzle at the aft end of the engine.

Surrounding the engine core is a fire zone in which elevated temperatures must be quickly and reliably detected so that, in appropriate conditions, fire suppression can be employed, or other action taken to ensure the safety of the aircraft.

A fire detection system typically includes one or more thermal detectors, or other types of sensing elements, to provide a warning during engine operation if excess temperatures are detected or other conditions indicative of a fire are detected. The sensing elements are attached to a mounting system, which is attached either to the nacelle, to the engine core itself, and/or to an engine support structure. The sensing elements are suspended away from the surface of the nacelle, the engine core, or the support structure by a mounting system such that the sensing elements detect the conditions in an air space between the engine core and the nacelle.

The spacing of the sensing elements away from the engine core or support structure competes for space also used by other components. In addition to the fire detection system, the space between the engine core and the nacelle is filled with a multitude of components such as valves, tubes, ducts, wires, generators, gearboxes, sensors, etc. In many installations, the space between the engine core and the nacelle is further limited by the need to provide a thermal blanket surrounding all or part of the engine core. The thermal blanket provides thermal and acoustic insulation during engine operation. In many installations, such as nacelles constructed with composite panels, the thermal blanket might be necessary for shielding the composite panel from engine operating temperatures that could damage the composite panel.

A compact and light weight mounting system is desired for mounting the fire detection system in accordance with aircraft regulations and operating requirements, while also ensuring simplicity and accuracy of the installation/assembly and allowing flexibility in the placement of the mounting system components.

SUMMARY

According to an aspect of the invention, an assembly is provided for a propulsion system that include a jet engine housed within a nacelle. The assembly includes a thermal blanket and a bracket orientation clip. The blanket is configured to at least partially surround the engine. The blanket is also configured to thermally shield at least a portion of the nacelle from heat energy radiated by the engine. The clip includes a base and a plurality of anti-rotation tabs. The base is bonded to the blanket, and the tabs extend out from the base and away from the blanket.

According to another aspect of the invention, an assembly is provided for a turbofan propulsion system that includes a jet engine and a nacelle. The assembly includes a blanket and a fire detection system. The blanket is configured to thermally insulate at least a portion of the nacelle from the engine. The fire detection system includes a sensing wire, a bracket and an orientation clip that is bonded to the blanket. The bracket is configured to locate the sensing wire a distance from the blanket. The clip is arranged between the blanket and the bracket. The clip is configured to limit or substantially prevent rotation of the bracket relative to the blanket.

According to still another aspect of the invention, another assembly is provided for a turbofan propulsion system that includes a jet engine. The assembly includes a nacelle, a blanket, a clip, a bracket and a fastening mechanism The blanket is configured to arrange between at least a portion of the nacelle and the engine. The clip is bonded to the blanket, and includes a base and a plurality of tabs that are connected to the base. The bracket is nested with the clip laterally between at least some of the tabs. The fastening mechanism connects the bracket to the nacelle.

The clip may be configured to limit or substantially prevent rotation of the bracket relative to the blanket and/or the nacelle.

The assembly may include an inner fixed structure for the nacelle, and a fastening mechanism. The fastening mechanism may connect the bracket to the inner fixed structure.

The assembly may include a locating feature configured with the inner fixed structure. The fastening mechanism may be connected to the locating feature.

The assembly may include a mounting block connected to the bracket and supporting the sensing wire.

The base may be welded to the blanket. The base may also or alternatively be adhered or otherwise bonded to the blanket.

The base may be configured as or otherwise include a generally rectangular and/or flat portion of the clip.

The tabs may be respectively arranged at corners of the base.

The base may extend laterally between a pair of the tabs.

The assembly may include a bracket for a fire detection system. The clip may be arranged between the blanket and the bracket. The clip may be configured to limit or substantially prevent rotation of the bracket relative to the blanket.

The bracket may be nested with the clip laterally between a pair of the tabs.

The assembly may include a fastening mechanism for connecting the bracket to the nacelle. The fastening mechanism may project through the bracket, the clip and the thermal blanket. The fastening mechanism may be configured as or otherwise include a rivet, or a head connected to a threaded sleeve, or any other type of fastener.

The assembly may include a mounting block connected to the bracket. The mounting block may be configured to support a sensing wire for the fire detection system.

The assembly may also include a second mounting block connected to the bracket. The second mounting block may be configured to support a second sensing wire for the fire detection system.

The assembly may include a second mounting block connected to a second mounting bracket for the fire detection system. The second mounting block may be configured to support a second sensing wire for the fire detection system. The clip may be arranged between the blanket and the second bracket. The clip may be configured to limit or substantially prevent rotation of the second bracket relative to the blanket.

Other features and advantages of the present invention should be apparent from the following description of the preferred embodiments, which illustrate, by way of example, the principles of the invention.

DETAILED DESCRIPTION

In the following description, various embodiments will be described. For purposes of explanation, specific configurations and details are set forth in order to provide a thorough understanding of the embodiments. It will also be apparent to one skilled in the art that the present invention can be practiced without the specific details described herein. Furthermore, well-known features may be omitted or simplified in order not to obscure the embodiment being described.

Figure 1:
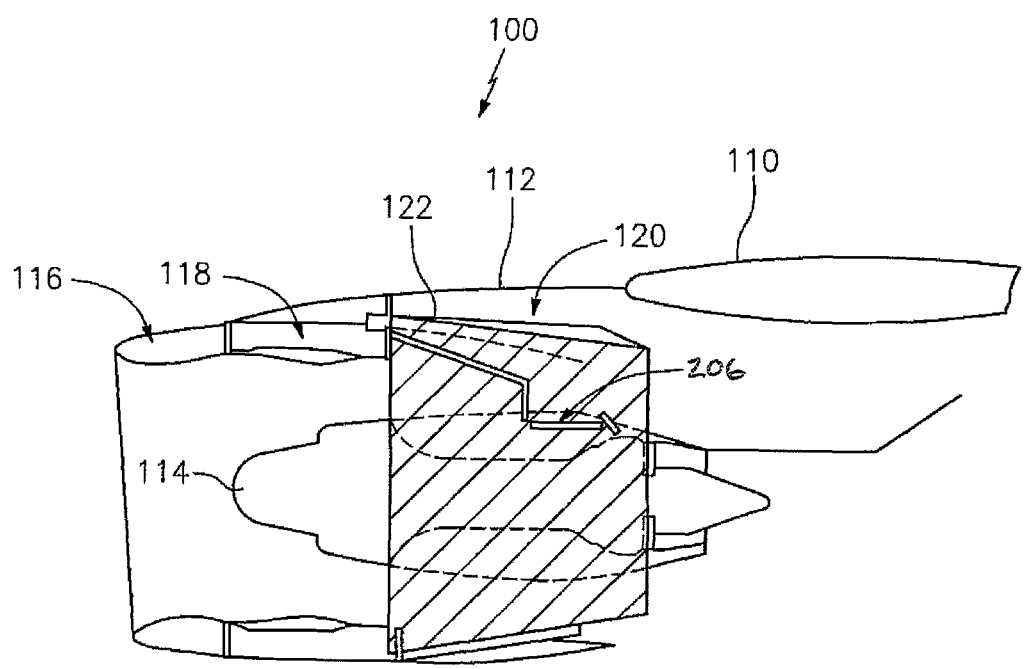
FIG. 1 is a side schematic view of a turbofan propulsion system that includes a fire detection system with sensing element supports in accordance with the embodiments disclosed herein.

FIG. 1 is a side schematic view of a jet engine 114 (e.g., an engine core) enclosed within a nacelle 100 to form a turbofan propulsion system. The engine 114 is supported from a wing 110 of an aircraft by pylon structure 112. An inlet cowl 116 of the nacelle 100 is located at a forward end of the nacelle 100. A fan cowl 118 surrounds a turbine fan which compresses and accelerates the incoming air stream. A thrust reverser 120 is configured at an aft end of the nacelle 100 to help slow the aircraft upon landing. A thrust reverser panel or sleeve 122 slides along a path defined by one or more beams on the thrust reverser 120. When the thrust reverser panel 122 is deployed upon landing, it causes thrust from the engine 114 to be diverted and partially reversed so that aircraft speed is reduced.

Figure 2:
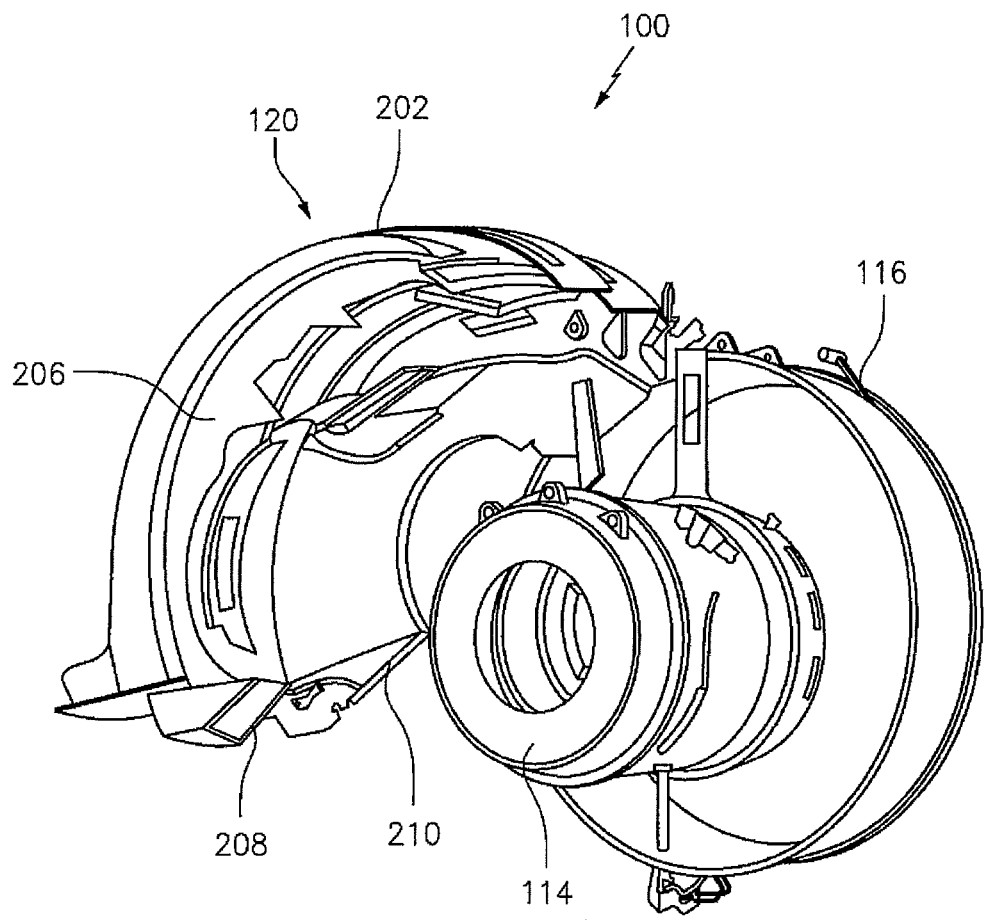
FIG. 2 is a perspective view of the propulsion system in FIG. 1 from an aft end looking forward.

FIG. 2 is a perspective view of the engine 114 and the nacelle 100 from the aft end looking forward. For simplification and a better view, several components are not shown such as the fan, the fan cowl, the inlet cowl, and the right half of the thrust reverser 120. The left half 202 of the thrust reverser 120 is shown in a raised position. The left half 202 includes an inner surface which faces the engine 114 formed in the inner fixed structure (IFS) 206 of the left half 202. The thrust reverser 120 left half and right half are closed during flight, forming a substantially enclosed shell around the engine 114 with the left half IFS and the right half IFS. Sensors of fire detection systems 208, 210 are mounted on the inner surface of the IFS 206 of the nacelle.

Figure 3:
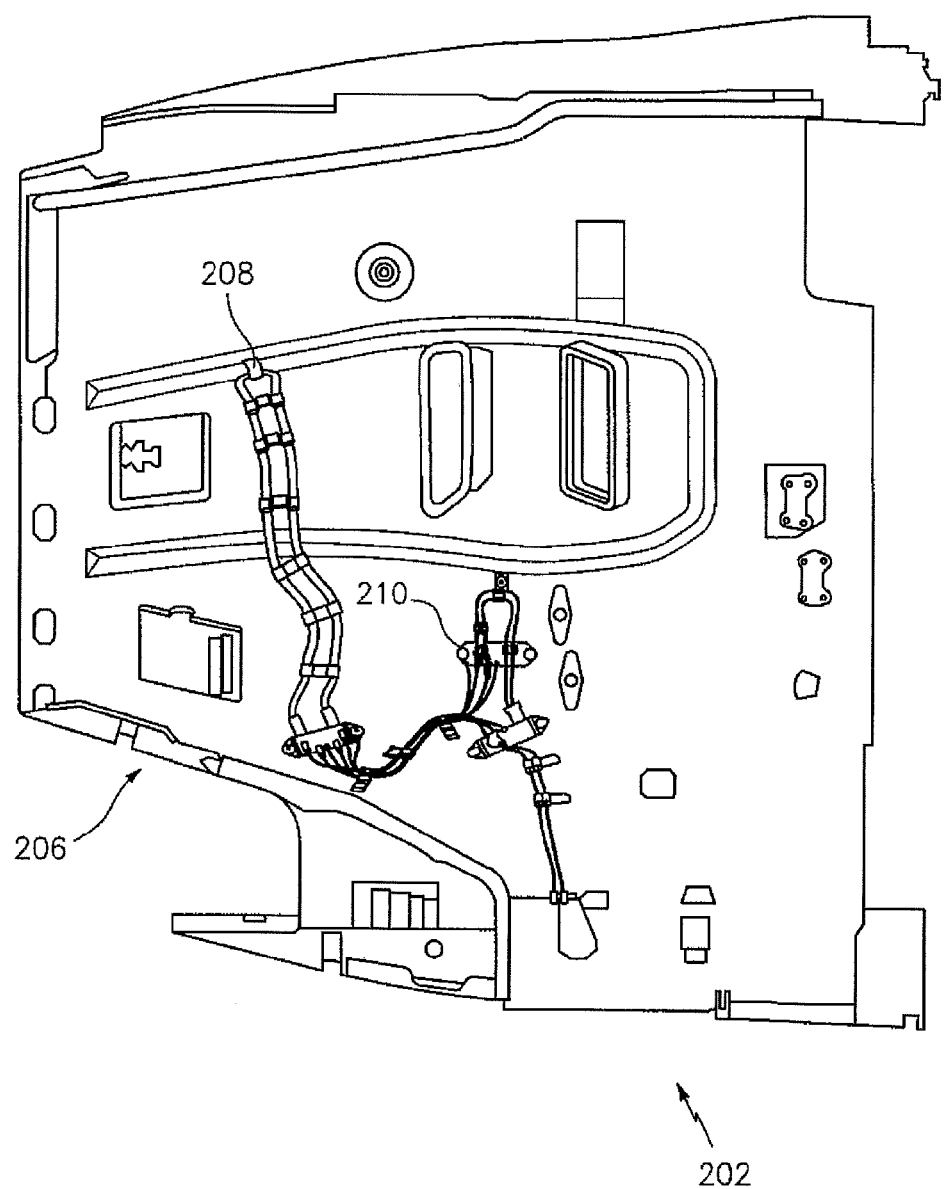
FIG. 3 is a side view of an inside surface of a left-side inner fixed structure illustrated in FIG. 2 configured with the fire detection system in accordance with the embodiments disclosed herein.

FIG. 3 is a side view of the inner surface of the IFS 206 shown in FIG. 2, showing the fire detection system mounted thereon in accordance with the embodiments disclosed herein. The aft end is to the left of the drawing, the forward end is to the right of the drawing.

Figure 4:
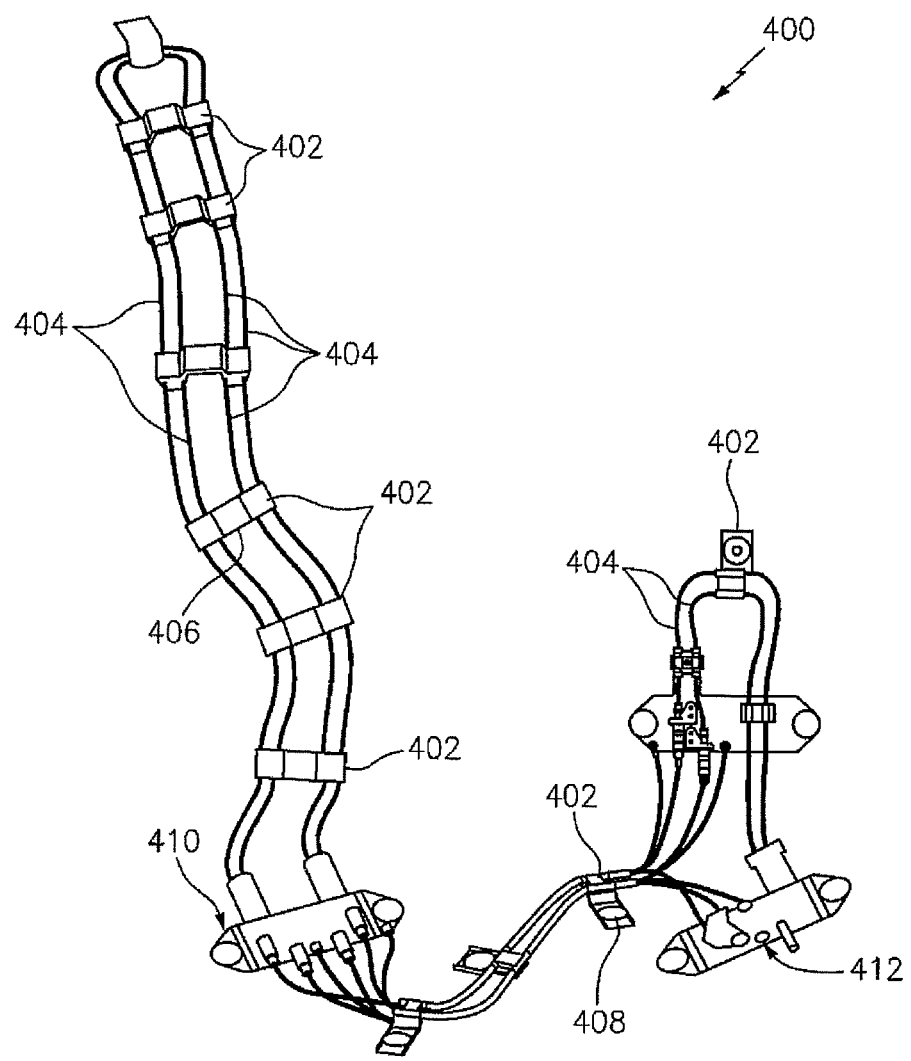
FIG. 4 is a perspective view of an exemplary fire detection system.

FIG. 4 is a perspective view of a fire detection system 400. FIG. 4 shows that the fire detection system 400 may include spaced-apart mounting blocks 402 through which sensing wires 404 are passed. As described further below, the sensing wires 404 are located at a position that is a predetermined distance from the nacelle by support assemblies 406, 408, 410, 412. The support assembly 406 may be configured as a double-bracket arrangement that supports two pairs of the sensing wires 404 and corresponding mounting blocks 402. The support assembly 408 may be configured as a single-bracket arrangement that supports a single pair of the sensing wires 404 and corresponding mounting blocks 402. The support assemblies 410 and 412 may each be configured as a bracket that supports additional wires and connections for the fire detection system, as well as a single wire and connection.

Figure 5:
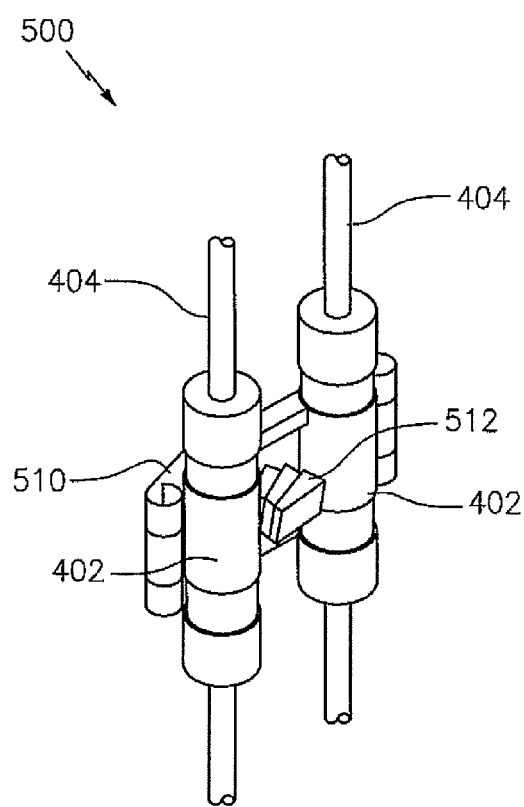
FIG. 5 is a perspective view of certain mounting system details for the fire detection system illustrated in FIG. 4.

FIG. 5 is a perspective view of a sensor assembly 500 that includes a pair of mounting blocks 402 and a double-bracket arrangement 406 such as those illustrated in FIG. 4. FIG. 5 shows that the mounting block 402 may be generally cylindrical in shape, with the sensing wire 404 passing out from each end of the cylinder. A mounting bracket 510 holds the mounting blocks 402 in fixed position and facilitates mounting the sensor assembly 500 to a support assembly, described in more detail below. The sensor assembly 500 may be mounted to the support assembly using, for example, a fastener 512 such as a screw or the like.

Figure 6:
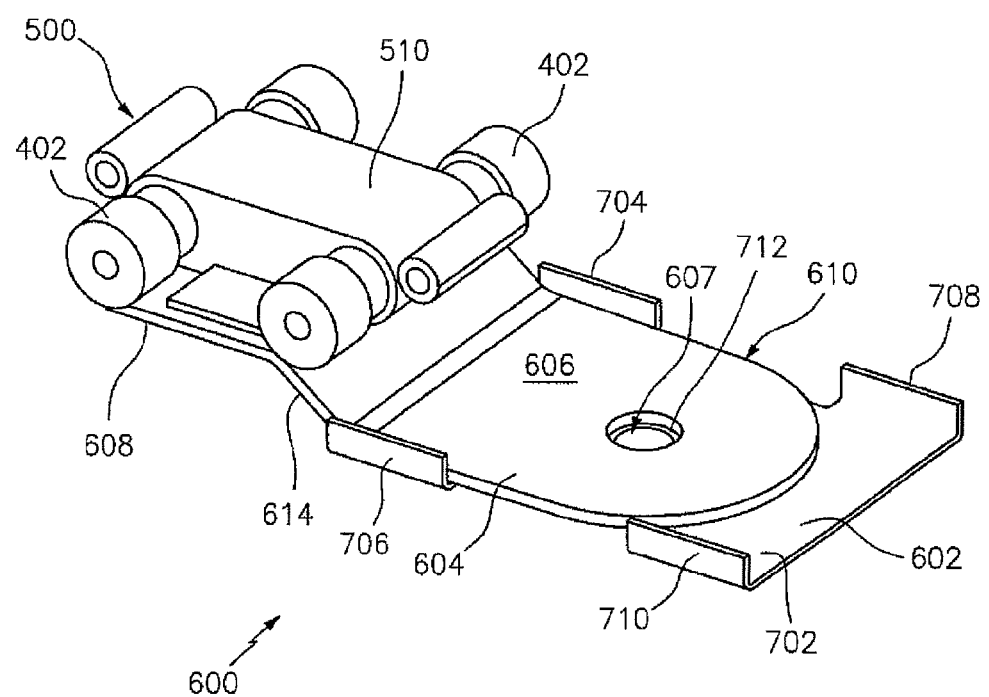
FIG. 6 is a perspective view of additional mounting system details in accordance with one of the embodiments disclosed herein.

FIG. 6 is a perspective view of a single-bracket support assembly 600 in accordance with the embodiments disclosed herein. The support assembly 600 includes a bracket orientation clip 602 on which is placed a bracket 604. The bracket 604 has a planar surface 606 with a bore 607 formed therein and sized to receive a fastening mechanism (described in more detail below). When the fire detection system is attached to the IFS, the retainer urges the bracket against the aircraft IFS (see, e.g., FIG. 9). The bracket 604 includes an attachment surface 608 configured to receive a sensor assembly 500 and its associated mounting bracket 510. The attachment surface 608 is offset from the planar surface 606 so that the attachment surface 608 is a predetermined distance away from the IFS when the bracket assembly 600 is installed. For example, in FIG. 6, a connecting portion 614 joins the attachment surface 608 to the planar surface 606 such that the attachment surface 608 is substantially parallel to the planar surface 606 and spaced away at a predetermined distance.

The spacing distance of the attachment surface 608 from the IFS is selected so that when the support assembly 600 is coupled to the IFS at the planar surface 606, the attachment surface 608 is spaced away from the IFS by a predetermined distance. The connecting portion 614 shown in FIG. 6 joins the planar surface 606 to the attachment surface 608 at an angle, generally forming a Z-shape when viewed in cross-section. The connecting portion 614, however, may be provided in different shapes. For example, a curved shape may be used in place of the flat portion between the planar surface 606 and attachment surface 608, or more convoluted shapes may be used, as desired for an application and operating regimen.

Figure 7:
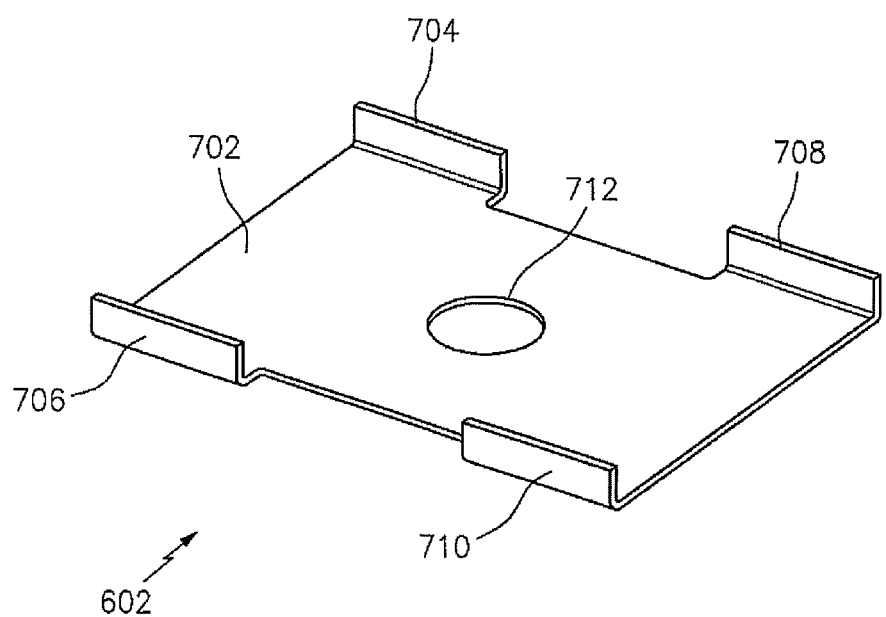
FIG. 7 is a perspective view of an anti-rotation clip in accordance with embodiments disclosed herein.

Referring to FIG. 7, the orientation clip 602 includes a substantially planar, four-sided flat portion 702 (e.g., a generally rectangular base) with raised tabs 704, 706, 708, 710 (e.g., anti-rotation tabs) at approximately each corner. The flat portion 702 extends laterally between a first set of the tabs 704 and 706 and between a second set of the tabs 708 and 710, which is longitudinally separated from the first set of the tabs 704 and 706.

Referring now to FIG. 6, the flat portion 702 includes an opening 712 that aligns with the bore 607 of the bracket 604 when assembled and installed. An opposed pair of the raised tabs (e.g., 704 and 706) may limit or substantially prevent rotation of the bracket 604 on the orientation clip 602 when a torque is applied to the fastening mechanism (e.g., fastening mechanism 810 of FIG. 8), such as when the assembly 600 is installed The fastening mechanism may be configured as or otherwise include, for example, a retainer such as a threaded screw and nut combination, or the like. Limiting or preventing rotation of the bracket 604 when a rotational force is applied to the fastening mechanism and, in turn, the bracket, during installation improves the ease of installation. For example, the orientation clip 602 can help ensure that during installation the bracket 604 is placed in the proper orientation and position relative to the IFS. The orientation clip 602 also can assist in using the support assembly to hold down and maintain a thermal blanket (not shown) in position, as described further below. The bracket 604 and its associated tabs also allow for precise positioning of the sensor assembly on the IFS.

Figure 8:
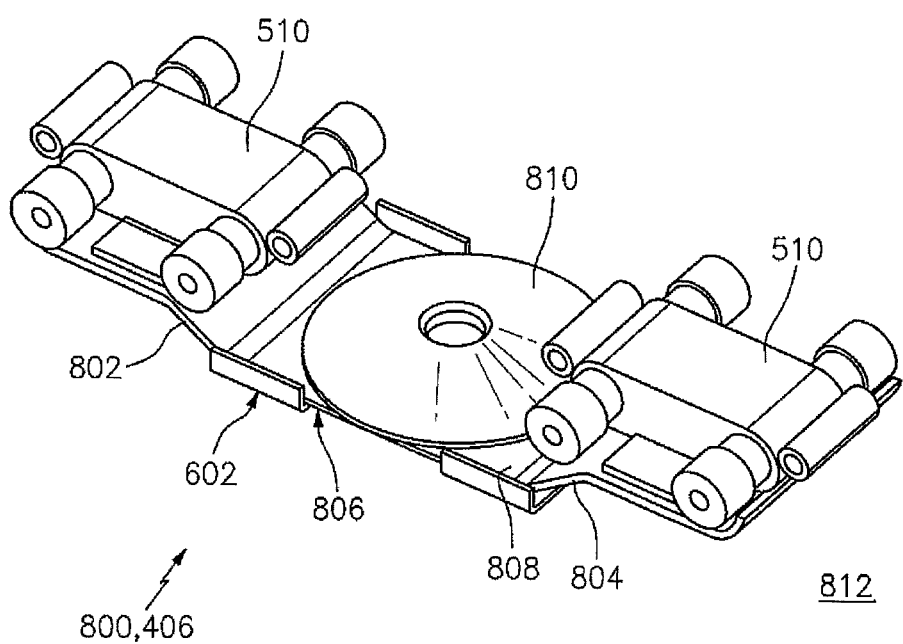
FIG. 8 is a perspective view of a support assembly with dual brackets in accordance with embodiments disclosed herein.

FIG. 8 is a perspective view of a support assembly 800 with dual brackets in accordance with embodiments disclosed herein, which is configured similar to the dual bracket assembly 406 of FIG. 4. The support assembly 800 includes a first support bracket 802 and a second support bracket 804, each of which supports a sensor assembly 510. Respective flat portions 806, 808 of the two support brackets 802, 804 are overlapped on the orientation clip 602. Alternatively, support brackets 802, 804 may be fabricated as a single support bracket. A fastening mechanism 810 attaches the brackets 802, 804 to the IFS (not shown). Further details of the fastening mechanism 810 for attaching the support assembly 800 to the IFS may be understood with reference to FIG. 9.

Figure 9:
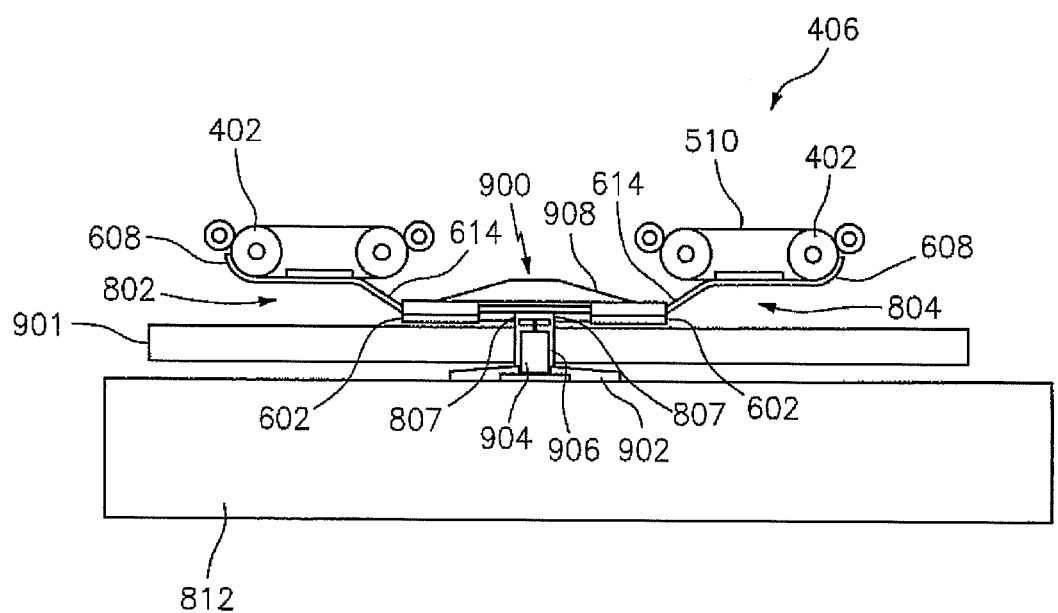
FIG. 9 is a cross-sectional side view of the support assembly illustrated in FIG. 8 installed on an inner fixed structure and holding a thermal blanket in place.

FIG. 9 is a cross-sectional side view of the support assembly 406, 800 illustrated in FIGS. 4 and 8, installed on an IFS 812. The left bracket 802 and the right bracket 804 are coupled to the IFS 812 by a fastening mechanism 900 and hold a thermal blanket 901 in place relative to the IFS 812. This thermal blanket 901 may surround and provide thermal and/or acoustic insulation for some or all of the engine core. The thermal blanket 901, for example, may shield composite panels of the nacelle from relatively high operating temperatures of the engine core. The thermal blanket 901 may have a flexible sheet-like body with a heat reflective surface that faces the engine. The thermal blanket 901 may include a single layer or multiple layers of materials bound together between face sheets (e.g., metal foil sheets). The thermal blanket 901 may also or alternatively include a core of fibers arranged between the face sheets. The thermal blanket 901 may be constructed from metal and/or any other suitable material. Various thermal blankets are known in the art, and the present disclosure is not limited to any particular thermal blanket types or configurations. Furthermore, the thermal blanket 901 illustrated in FIG. 9 is optional, and may be included or omitted depending on the aircraft requirements.

The fastening mechanism 900 includes a location feature attached to the IFS 812, the location feature including a base portion 902 and a stud or pilot portion 904. The base portion and stud portion are typically provided as a single one-piece structure, but may be separately provided. When installed, such as illustrated in FIG. 9, the stud portion 904 extends outwardly from the plane of the IFS 812 and provides a locating feature or pilot guide that aligns with the bore 807 of each bracket 802, 804. A sleeve portion 906 and head portion 908 fit over the stud 904. The sleeve portion 906 and head portion 908 may be configured as, for example, a rivet or threaded cap that fits over the stud portion 904. The stud portion 904 may be threaded, such as when it is provided as a screw or bolt, in which case the sleeve portion 906 will be internally threaded and may be screwed down onto the stud portion 904. If the stud portion 904 is not threaded, then the sleeve portion 906 fits over the stud portion 904 with a mechanical or friction fit, such as the case with a rivet that is crimped in place to prevent movement. Examples of a suitable base portion and stud portion may include one or more of the fastening products available from Click Bond, Inc. of Carson City, Nev., USA.

When the sleeve portion 906 and head portion 908 are coupled to the location feature that includes the base portion 902 and stud portion 904, in an installation configuration such as illustrated in FIG. 9, the sleeve portion 906 and head portion 908 are effectively coupled to the IFS 812. In this way, the fastening mechanism 900 urges both of the brackets 802, 804 toward the IFS 812, and the attachment surface of each bracket is held at a position that is a predetermined distance from the IFS 812 when the support assembly is in the installation configuration.

The orientation clip 602 may be attached to the thermal blanket 901 by welding, epoxy adhesive, or any other bonding technique known to those skilled in the art. A typical welding technique involves applying electrical energy through the orientation clip 602 to the adjacent surface of the thermal blanket 901, which melts or otherwise fuses the orientation clip 602 and thermal blanket 901 together at approximately the location of the applied electrical energy. When the orientation clip 602 is fixedly bonded to the IFS 812, then the clip establishes the location and orientation for mounting brackets 604, etc., to be mounted to the IFS 812.

Figure 10:
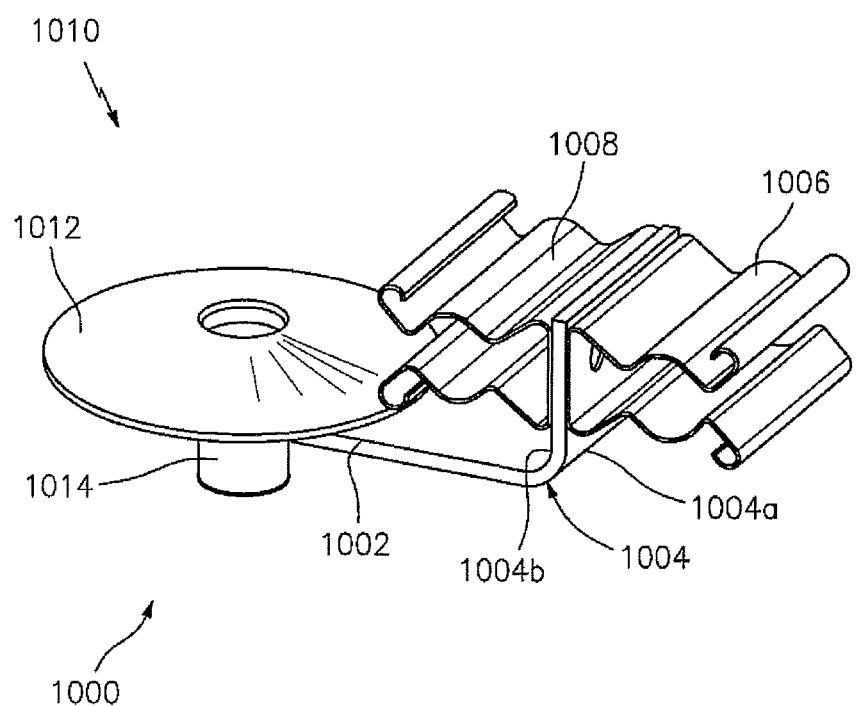
FIG. 10 is a perspective view of a support assembly in accordance with a second one of the embodiments disclosed herein.

FIG. 10 is a perspective view of a support assembly 1000 in accordance with an embodiment. The support assembly 1000 includes a bracket 1002 and an attachment portion 1004. In the FIG. 10 embodiment, the attachment portion 1004 is configured as an upturned end of the substantially planar bracket 1002. Two sensor cradles 1006, 1008 are attached to opposing sides 1004a, 1004b of the attachment portion 1004. These sensor cradles 1006 and 1008 are biased so that they will hold or secure in each of the cradles a mounting block 402 or a sensor wire 404. A fastening mechanism 1010 includes a locating feature, such as a stud or bolt, that aligns the bracket 1002 and holds the bracket 1002 to the IFS (not shown) so that the attachment portion 1004 is a predetermined distance from the IFS. As noted above, the fastening mechanism 1010 can include a stud and rivet combination, as illustrated in FIG. 10, or may include a cap and bolt combination, or the like. In FIG. 10, a cap portion 1012 and sleeve portion 1014 of the rivet are visible.

Figure 11:
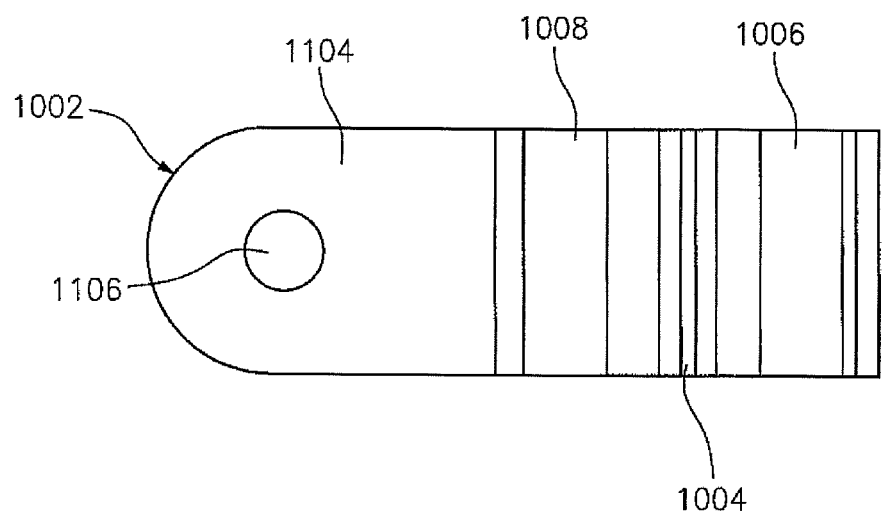
FIG. 11 is a plan view of the support assembly illustrated in FIG. 10.

FIG. 11 is a plan view of the bracket 1002 illustrated in FIG. 10. FIG. 11 shows the top planar surface 1104 of the bracket, as well as a bore 1106 sized to receive the locating feature of the fastening mechanism 1010 (see FIG. 10).

Figure 12:
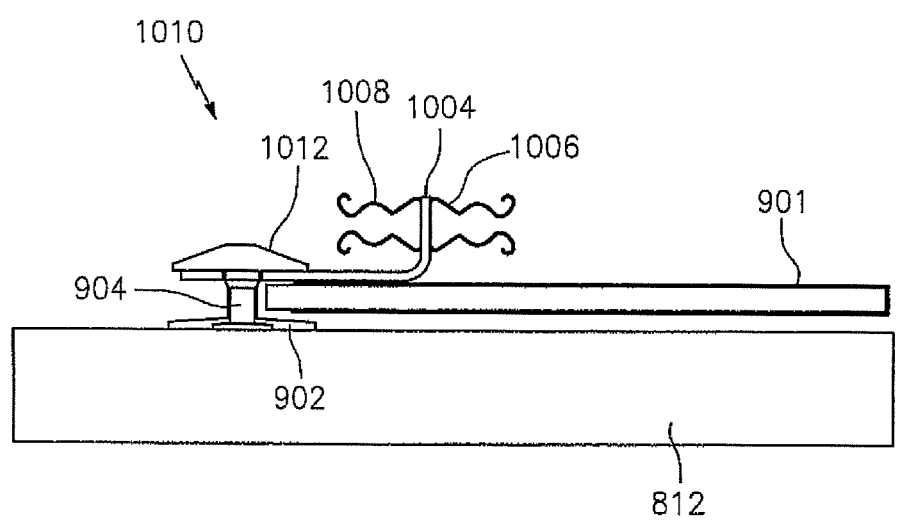
FIG. 12 is a cross-sectional side view of the support assembly illustrated in FIG. 10 installed on an inner fixed structure and holding a thermal blanket in place.

FIG. 12 is a cross-sectional side view of the support assembly 1000 illustrated in FIG. 10 installed to the IFS 812 and holding a thermal blanket 901 in place. The support assembly 1000 is illustrated in FIG. 12 in an installed configuration, held to the IFS 812 by a fastening mechanism 900 as described above and illustrated in FIG. 9.

Figure 13:
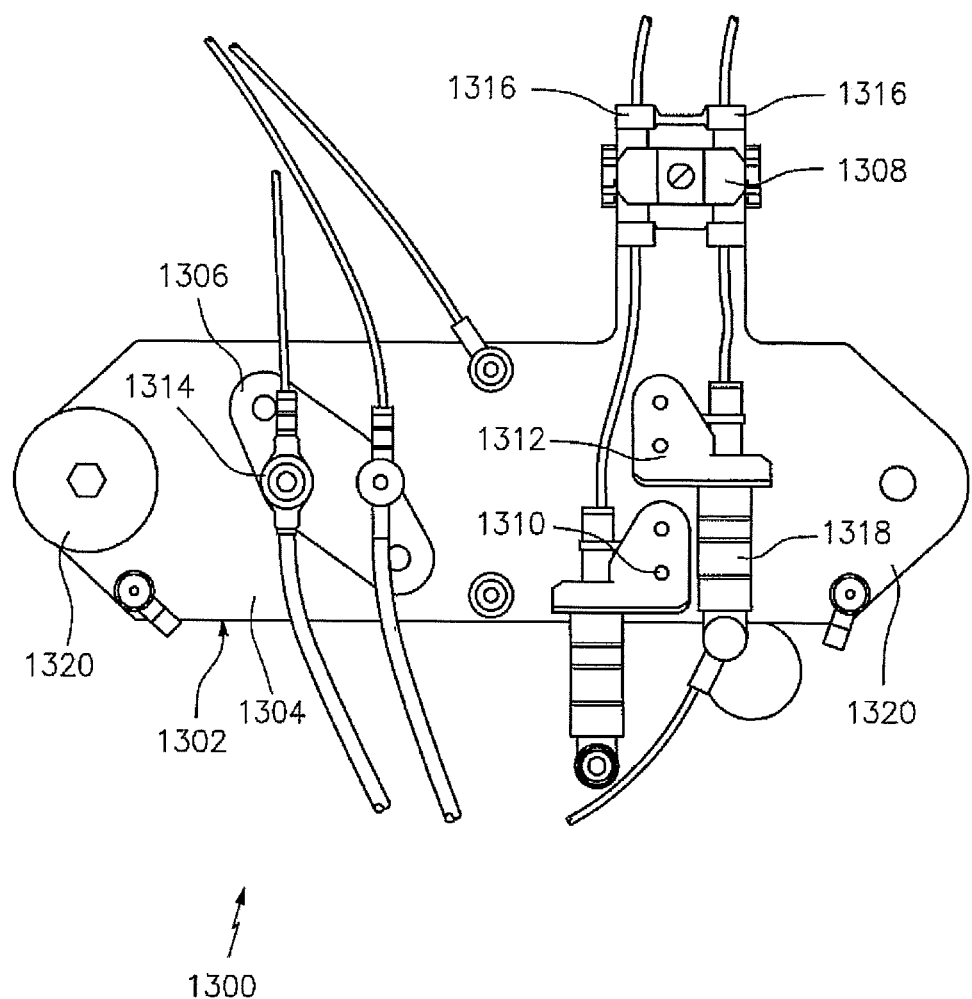
FIG. 13 is a plan view of a support assembly in accordance with embodiments disclosed herein and other connections.

FIG. 13 is a plan view of a support assembly 1300 constructed in accordance with embodiments disclosed herein. The support assembly 1300 includes a substantially planar bracket 1302 with an attachment surface 1304. A plurality of sensor cradles 1306, 1308, 1310 and 1312 are attached to the bracket 1302 and receive a variety of sensors 1314, 1316, 1318. The support assembly 1300 is coupled to the IFS by one or more fastening mechanisms 1320; e.g., through-fasteners.

Figure 14:
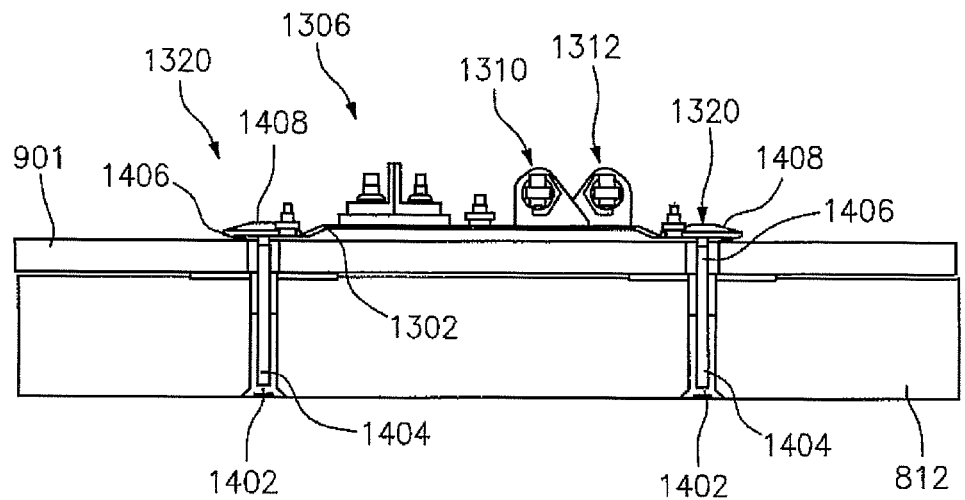
FIG. 14 is a cross-sectional side view of the support assembly illustrated in FIG. 13, showing the mounting of the support assembly to the inner fixed structure with through-fasteners.

FIG. 14 is a cross-sectional side view of the connector assembly illustrated in FIG. 13, showing the mounting of the support assembly 1300 to the IFS 812 with the fastening mechanisms 1320. The fastening mechanisms 1320 each includes a locating feature such as a base portion 1402 and a stud or pilot portion 1404, which is coupled to the aircraft IFS 812. The locating feature aligns with a bore (see, e.g., FIGS. 15-17) of the bracket 1302. As noted, the base portion 1402 and pilot portion 1404 are typically provided as a single one-piece structure, but may be separately provided. When installed, such as illustrated in FIG. 14, the pilot portion 1404 extends outwardly from the plane of the IFS 812 and provides a locating feature or pilot guide that aligns with the bore of the bracket 1302. In the FIG. 14 embodiment, a threaded cap or rivet is used to urge the bracket toward the IFS 812. More particularly, an insert portion 1406 fits into the pilot portion 1404. The insert portion 1406 is topped at one end with a head portion 1408 and the two may be configured as, for example, a rivet or threaded cap that fits over the pilot portion 1404. The pilot portion 1404 may be internally threaded, in which case the insert portion 1406 will be threaded and may be screwed down into the pilot portion 1404. If the insert portion 1406 is not threaded, then the insert portion 1406 fits into the pilot portion 1404 with a mechanical or friction fit, such as the case with a rivet that is crimped in place to prevent movement. Examples of a suitable base portion and stud portion may include one or more of the fastening products available from Click Bond, Inc. of Carson City, Nev., USA.

Figure 15:
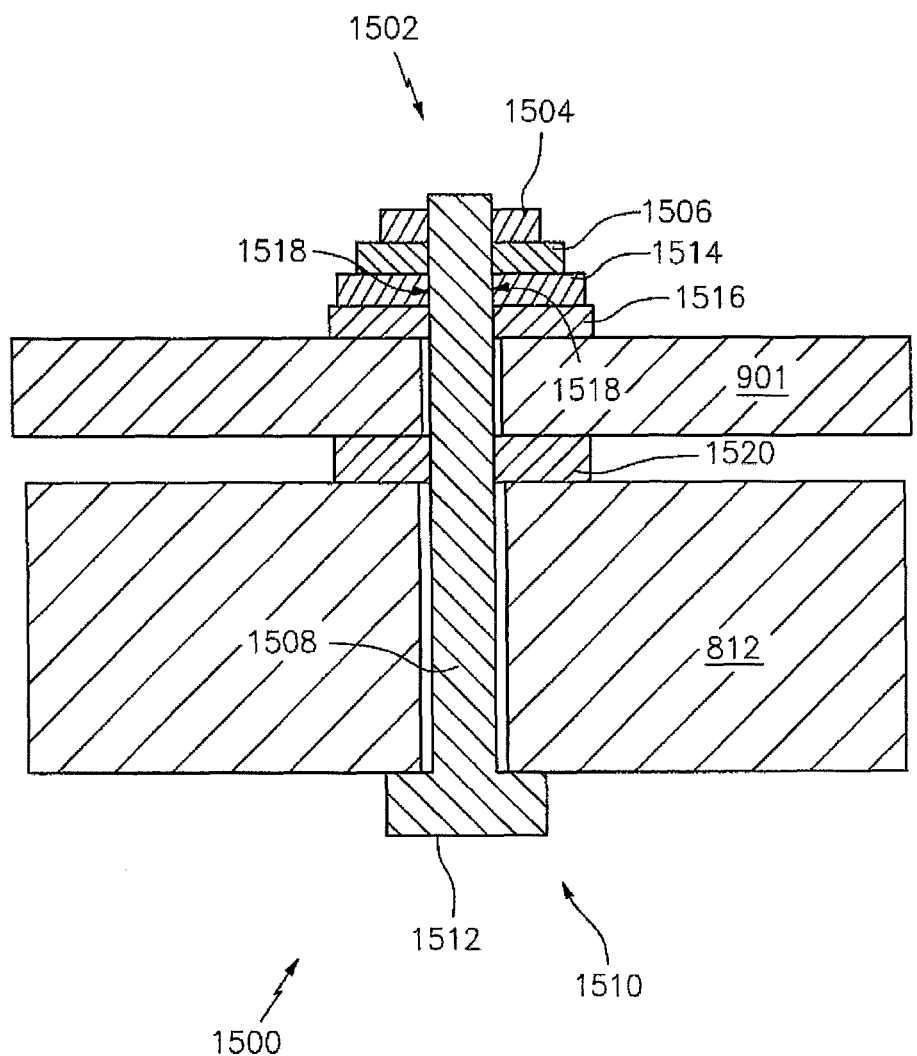
FIG. 15 is a simplified cross-sectional side view of a support assembly embodiment that fastens a thermal blanket and is attached to an inner fixed structure with a stud and nut combination.

FIG. 15 is a cross-sectional side view of a support assembly embodiment that fastens a sensor bracket 1514 to the thermal blanket 901 and the IFS 812 with a fastening mechanism 1502 comprising a stud and nut combination. The structures illustrated in FIG. 15 are not drawn to scale; rather, some dimensions of the structures are exaggerated for purposes of illustration. A nut 1504 and washer 1506 are threaded onto a stud portion 1508 of a bolt or pilot guide 1510 having a head 1512 at the opposite surface of the IFS 812. It should be apparent that the nut 1504 can be replaced by a threaded cap. A sensor bracket 1514 is urged toward the IFS 812 and against an orientation clip 1516 by the fastening mechanism 1502. The sensor bracket 1514 includes a bore 1518 sized to receive the stud portion 1508, which provides a locating feature of the fastening mechanism 1502. An optional grommet 1520 may be provided to provide easier placement of the thermal blanket 901 over the stud portion 1508.

Figure 16:
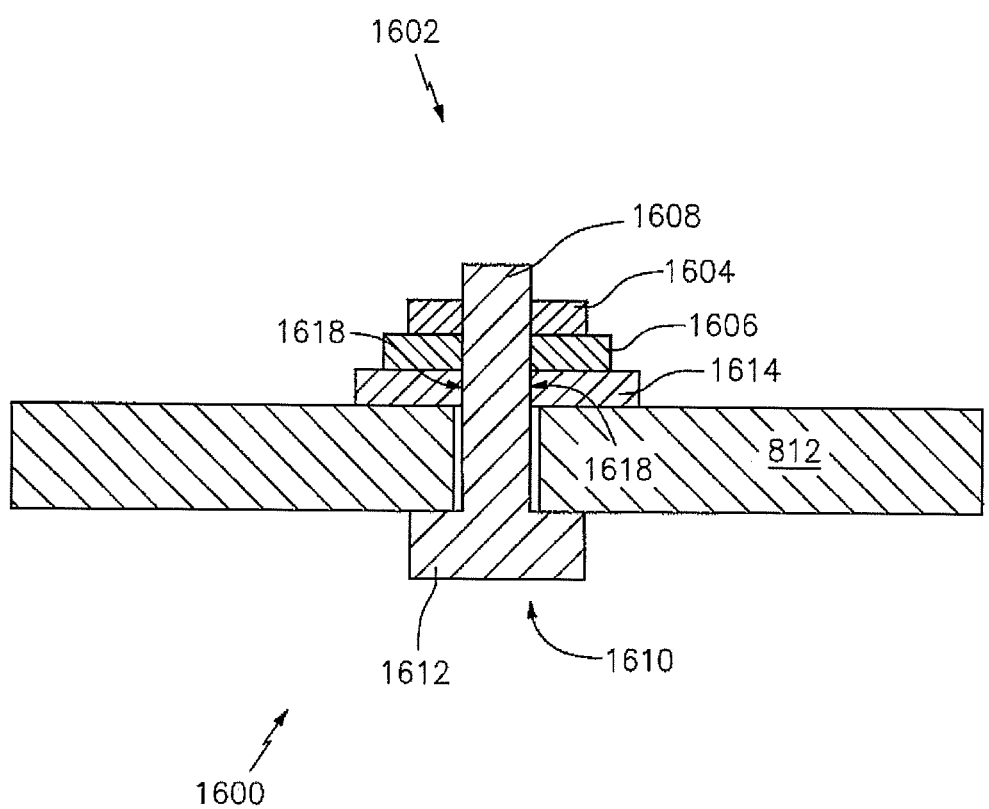
FIG. 16 is a simplified cross-sectional side view of a support assembly embodiment for use without a thermal blanket and attached to an inner fixed structure with a stud and nut combination.

FIG. 16 is a cross-sectional side view of a support assembly embodiment for use without a thermal blanket, attached to the IFS 812 with a stud and nut combination. The structures illustrated in FIG. 16 are not drawn to scale; rather, some dimensions of the structures are exaggerated for purposes of illustration. The support assembly is attached to the IFS 812 with a fastening mechanism 1602 including a stud and nut combination. A nut 1604 and washer 1606 are threaded onto a stud portion 1608 of a bolt or pilot guide 1610 having a head 1612 at the opposite surface of the IFS 812. A bracket 1614 is urged toward the IFS 812 by the fastening mechanism 1602. The bracket 1614 includes a bore 1618 sized to receive the stud portion 1608, which provides a locating feature of the fastening mechanism 1602.

Figure 17:
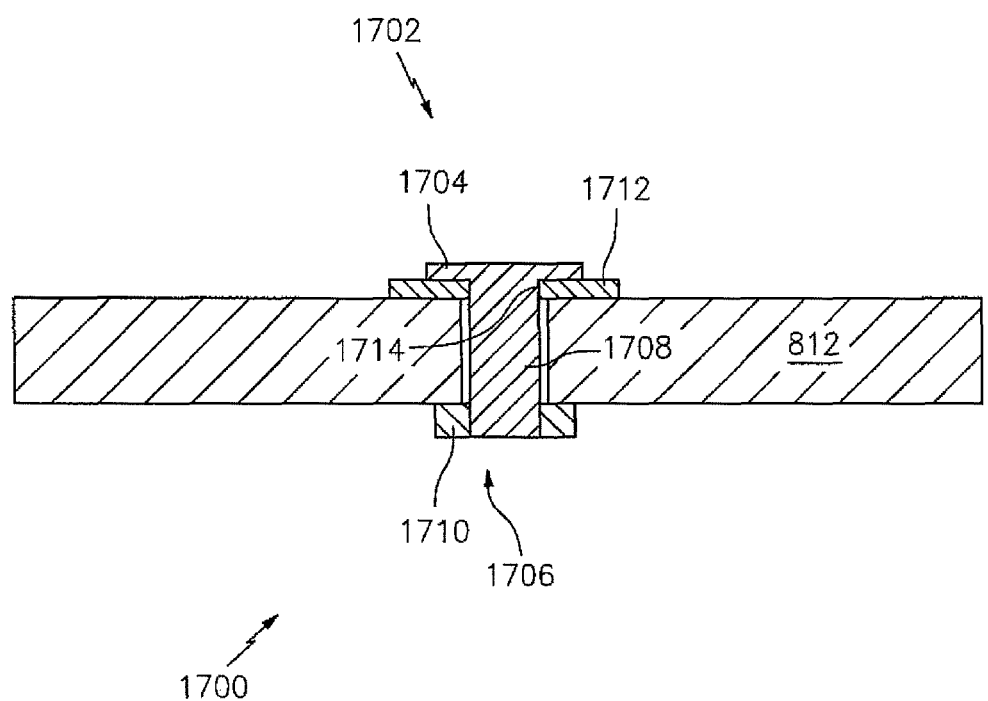
FIG. 17 is a simplified cross-sectional side view of a support assembly embodiment for use without a thermal blanket and attached to an inner fixed structure with a rivet configuration.

FIG. 17 is a cross-sectional side view of a support assembly embodiment for use without a thermal blanket, attached to the IFS 812 with a fastening mechanism comprising a rivet configuration. The structures illustrated in FIG. 17 are not drawn to scale; rather, some dimensions of the structures are exaggerated for purposes of illustration. The support assembly is attached to the IFS 812 with a fastening mechanism 1702 configured as a rivet combination. A rivet cap 1704 is crimped onto a rivet stud portion 1708 having a head 1710 at the opposite surface of the IFS. As known to those skilled in the art, the rivet combination 1702 may be installed by mechanically deforming an end of the stud portion 1708, or through other similar crimping techniques for installing a rivet. A bracket 1712 is urged toward the IFS 812 by the fastening mechanism rivet 1702. The bracket 1712 includes a bore 1718 sized to receive the rivet stud portion 1708, which provides a locating feature of the fastening mechanism 1702.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

We claim:

1. An assembly for a propulsion system including a jet engine housed within a nacelle, the assembly comprising:
   a thermal blanket configured to at least partially surround the engine, and thermally shield at least a portion of the nacelle from heat energy radiated by the engine;
   a bracket orientation clip including a base and a plurality of anti-rotation tabs;
   a bracket for a fire detection system; and
   a fastening mechanism configured to connect the bracket to the nacelle;
   wherein the base is bonded to the blanket, and the tabs extend out from the base and away from the blanket;
   wherein the bracket orientation clip is arranged between the blanket and the bracket, and configured to limit or substantially prevent rotation of the bracket relative to the blanket; and
   wherein the fastening mechanism projects through the bracket, the bracket orientation clip and the thermal blanket.

2. The assembly of claim 1, wherein the base is welded to the blanket.

3. The assembly of claim 1, wherein the base is adhered to the blanket.

4. The assembly of claim 1, wherein the base comprises a generally rectangular and flat portion of the bracket orientation clip.

5. The assembly of claim 1, wherein the anti-rotation tabs are respectively arranged at corners of the base.

6. The assembly of claim 1, wherein the base extends laterally between a pair of the anti-rotation tabs.

7. The assembly of claim 1, wherein the bracket is nested with the bracket orientation clip laterally between a pair of the anti-rotation tabs.

8. The assembly of claim 1, wherein the fastening mechanism comprises a rivet.

9. The assembly of claim 1, wherein the fastening mechanism comprises a head connected to a threaded sleeve.

10. The assembly of claim 1, further comprising a mounting block connected to the bracket, wherein the mounting block is configured to support a sensing wire for the fire detection system.

11. The assembly of claim 10, further comprising a second mounting block connected to the bracket, wherein the second mounting block is configured to support a second sensing wire for the fire detection system.

12. The assembly of claim 10, further comprising:
   a second bracket for the fire detection system; and
   a second mounting block connected to the second bracket, the second mounting block configured to support a second sensing wire for the fire detection system;
   wherein the bracket orientation clip is arranged between the blanket and the second bracket, and configured to limit or substantially prevent rotation of the second bracket relative to the blanket.

13. An assembly for a turbofan propulsion system including a jet engine and a nacelle, the assembly comprising:
   a blanket for thermally insulating at least a portion of the nacelle from the engine; and
   a fire detection system including a sensing wire, a bracket and an orientation clip bonded to the blanket;
   the bracket configured to locate the sensing wire a distance from the blanket; and
   the orientation clip comprising a base and a plurality of anti-rotation tabs extending out from the base and away from the blanket, the base including a planar portion;
   the planar portion of the base arranged between and engaged with the blanket and the bracket; and
   the bracket configured between the anti-rotation tabs such that the anti-rotation tabs limit or substantially prevent rotation of the bracket relative to the blanket.

14. The assembly of claim 13, further comprising:
   an inner fixed structure for the nacelle; and
   a fastening mechanism that connects the bracket to the inner fixed structure.

15. The assembly of claim 14, further comprising a locating feature configured with the inner fixed structure, wherein the fastening mechanism is connected to the locating feature.

16. The assembly of claim 13, further comprising a mounting block connected to the bracket and supporting the sensing wire.

17. An assembly for a turbofan propulsion system including a jet engine, the assembly comprising:
 a nacelle;
 a blanket configured to arrange between at least a portion of the nacelle and the engine;
 a clip bonded to the blanket, and including a base and a plurality of tabs that are connected to the base;
 a bracket nested with the clip laterally between at least some of the tabs; and
 a fastening mechanism connecting the bracket to the nacelle connecting the bracket to the nacelle, wherein the fastening mechanism projects through the bracket, the clip and the thermal blanket.

18. The assembly of claim 17, wherein the clip is configured to limit or substantially prevent rotation of the bracket relative to the blanket.

* * * * *